US009630582B1

(12) United States Patent
Faruque et al.

(10) Patent No.: US 9,630,582 B1
(45) Date of Patent: Apr. 25, 2017

(54) CRUSH-CAN WITH CORRUGATED CORE

(71) Applicant: FORD GLOBAL TECHNOLOGIES, LLC, Dearborn, MI (US)

(72) Inventors: Mohammed Omar Faruque, Ann Arbor, MI (US); James Chih Cheng, Troy, MI (US); S. M. Iskander Farooq, Novi, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/066,927

(22) Filed: Mar. 10, 2016

(51) Int. Cl.
*B60R 19/34* (2006.01)
*B60R 19/26* (2006.01)
*B33Y 10/00* (2015.01)
*B33Y 80/00* (2015.01)

(52) U.S. Cl.
CPC .............. *B60R 19/34* (2013.01); *B33Y 10/00* (2014.12); *B33Y 80/00* (2014.12); *B60R 2019/264* (2013.01)

(58) Field of Classification Search
CPC ... B60R 19/34; B60R 2019/264; B33Y 10/00; B33Y 80/00
USPC ........................................................ 293/133
See application file for complete search history.

(56) References Cited

U.S. PATENT DOCUMENTS

| 8,632,108 | B2 * | 1/2014 | Matuschek | .......... B62D 21/152 |
| | | | | 293/133 |
| 2002/0063433 | A1 * | 5/2002 | Gotanda | ................. B60R 19/34 |
| | | | | 293/132 |
| 2007/0261592 | A1 * | 11/2007 | Mochida | ................. B61D 15/06 |
| | | | | 105/392.5 |
| 2012/0112479 | A1 * | 5/2012 | Nagwanshi | ............. B60R 19/34 |
| | | | | 293/133 |
| 2012/0137864 | A1 | 6/2012 | Ortiz et al. | |
| 2012/0139273 | A1 * | 6/2012 | Jeong | ....................... F16F 7/121 |
| | | | | 293/132 |
| 2013/0076051 | A1 * | 3/2013 | Baldwin | ................. B60R 19/34 |
| | | | | 293/133 |
| 2013/0193699 | A1 * | 8/2013 | Zannier | .................... F16F 7/121 |
| | | | | 293/133 |
| 2015/0174828 | A1 | 6/2015 | Creuzer et al. | |
| 2015/0175109 | A1 * | 6/2015 | Mori | ....................... B60R 19/12 |
| | | | | 293/133 |
| 2015/0298634 | A1 * | 10/2015 | Hara | ....................... B60R 19/34 |
| | | | | 293/133 |
| 2015/0314743 | A1 * | 11/2015 | Matsushiro | ........... B60R 19/023 |
| | | | | 293/133 |

(Continued)

FOREIGN PATENT DOCUMENTS

CN 103465636 A 12/2013
CN 104760265 A 7/2015
DE 102014101907 A1 8/2015

OTHER PUBLICATIONS

English machine translation of CN103465636A.

(Continued)

*Primary Examiner* — Gregory Blankenship
(74) *Attorney, Agent, or Firm* — Jason Rogers; King & Schickli, PLLC

(57) ABSTRACT

A crush-can is provided. That crush-can includes a first wall, a second wall within the first wall and a corrugated core between the first wall and the second wall. A method for producing the crush-can via 3D printing is also disclosed.

19 Claims, 7 Drawing Sheets

(56) References Cited

U.S. PATENT DOCUMENTS

| | | | |
|---|---|---|---|
| 2016/0016229 A1* | 1/2016 | Czinger | B22F 3/1055 |
| | | | 296/205 |
| 2016/0207111 A1* | 7/2016 | Robrecht | B22F 5/00 |
| 2016/0237271 A1* | 8/2016 | Koehnke | C08L 31/04 |
| 2016/0243762 A1* | 8/2016 | Fleming | B29C 67/0066 |
| 2016/0245710 A1* | 8/2016 | Twelves, Jr. | F16F 1/025 |
| 2016/0250820 A1* | 9/2016 | Hundley | B29C 33/38 |

OTHER PUBLICATIONS

English machine translation of CN104760265A.
English machine translation of DE102014101907A1.
Jessica Lipsky; "Cars Made to Order at Retail"; Electrical Engineering, NCTU; Sep. 19, 2014; p. 1-2; Hsinchu, Taiwan.
T'Jae Gibson; "Army Research Lab, Purdue Explore 3-D Printing to Fix Deployed Equipment, Cut Maintenance Costs"; Army Research Laboratory, Public Affairs; http://www.army.mil/article/109144/Army_Research_Lab_Purdue_explore_3_D_printing_to_fix_deployed_equipment_cut_maintenance_costs/; Aug. 13, 2013; pp. 1-2.

* cited by examiner

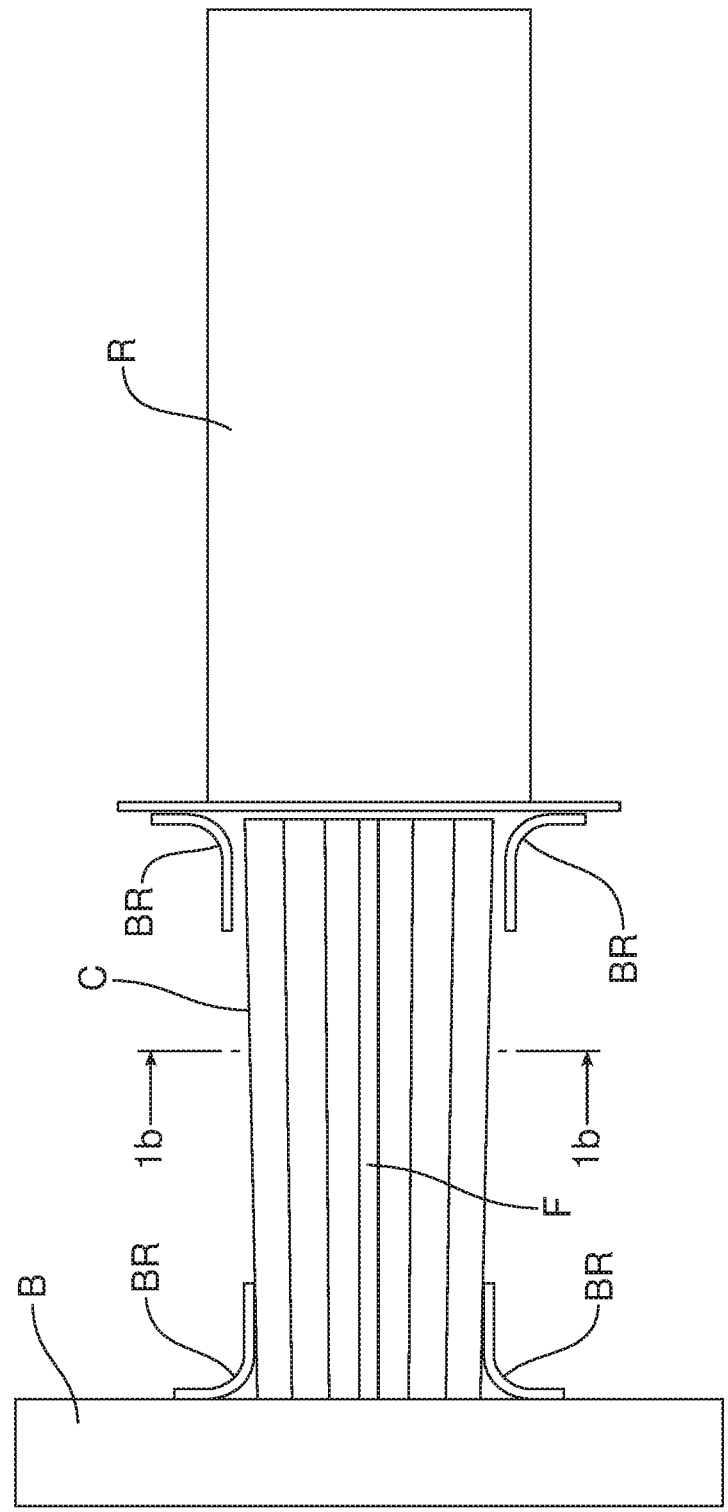

CRUSH-CAN WITH CORRUGATED CORE

TECHNICAL FIELD

This document relates generally to the motor vehicle equipment field and, more particularly, to a new and improved crush-can incorporating a corrugated core as well as to a method of making that crush-can via 3D printing.

BACKGROUND

A crush-can is a device utilized to absorb the energy from a collision and thereby enhance the safety of occupants of a motor vehicle. FIG. 1a illustrates a crush-can C, of prior art design, mounted between a bumper B and a side rail R of a motor vehicle. As illustrated in FIG. 1b, a typical tapered crush-can C of prior art design is made of two halves with flanges F that are stamped separately and joined together with spot welds along the flange line. In order to assemble such a crush-can C with the front bumper B and the side rail R, brackets BR are generally required as shown in FIG. 1a. Besides the additional tooling needed for producing these brackets BR, their joining also adds to manufacturing complexity and increases overall production costs.

Prior art stamped crush-cans C as illustrated in FIGS. 1a and 1b are generally made using sheet metals of certain gauges. During an axial crash, the sheet metal folds on itself and plastically deforms to absorb energy. Bending strain is the largest on the surfaces of the folding metal sheet and virtually zero strain at the neutral surface. Thus, materials through their thickness are not utilized effectively in absorbing crash energy.

This document relates to a new and improved crush-can that may be made in a simple, inexpensive manner utilizing 3D printing. The crush-can includes a corrugated core provided between inner and outer frustoconical walls. In addition to being simple and inexpensive to produce, the new crush-can is easy to assemble as well as mount between the bumper and side rail. Further, advantageously, the new crush-can yields high specific energy absorption (SEA) to more efficiently absorb crash energy and thereby enhance the safety of a motor vehicle.

SUMMARY

In accordance with the purposes and benefits described herein, a new and improved crush-can is provided. That crush-can comprises a first wall, a second wall within the first wall and a corrugated core between the first wall and the second wall.

The first wall may be frustoconical in shape. The second wall may be frustoconical in shape. The first and second walls may both be frustoconical in shape with the second wall nested inside the first wall. In addition a first end element may be provided for closing a first end of the crush-can. Similarly, a second end element may be provided for closing a second end of the crush-can.

In some embodiments, the corrugated core has a width between the first wall and the second wall of between about 2.0 mm and about 3.0 mm. Further, the first wall may have a thickness of between about 0.1 mm and about 0.2 mm. Similarly, the second wall may have a thickness of between about 0.1 mm and about 0.2 mm.

In some embodiments the crush-can is flangeless. In some embodiments the crush-can includes a third wall within the second wall and a second corrugated core between the second wall and third wall. In such an embodiment, the first wall, the second wall and the third wall may all be frustoconical in shape. Flanges are generally required when two stamped parts are needed to be assembled to make a crush-can with closed section. Since 3D printers can print a closed section crush-can rather easily, flanges can be excluded completely. A flangeless crush-can can provide additional weight savings. In some cases, tabs or short flanges on some part of the crush-can may be required to attach an external part. This can also be easily accommodated with 3D printing.

A first end element may be provided for closing a first end of the three-walled crush-can. The second end element may be provided for closing a second end of the three-walled crush-can. Further, the width of the corrugated core between the first wall and the second wall may be between about 2.0 mm and about 3.0 mm. Similarly, the width of the second corrugated core between the second wall and the third wall may be between about 2.0 mm and about 3.0 mm.

In accordance with yet another aspect, a method is provided for producing a crush-can. That method may be described as comprising the step of 3D printing a unitary crush-can body including a first wall, a second wall within the first wall and a corrugated core between the first wall and the second wall. The method may also include the steps of closing a first end of the crush-can body with a first end element and closing a second end of the crush-can body with a second end element. In an alternative embodiment, the first and second end elements are 3D printed with the crush-can body and thus are a part of the unitary construction.

In the following description, there are shown and described several preferred embodiments of the crush-can. As it should be realized, the crush-can is capable of other, different embodiments and its several details are capable of modification in various, obvious aspects all without departing from the crush-can as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the crush-can and together with the description serve to explain certain principles thereof. In the drawing figures:

FIG. 1a is a schematic illustration of a crush-can of prior art design mounted between a bumper and side rail of a motor vehicle.

Figure 1B:
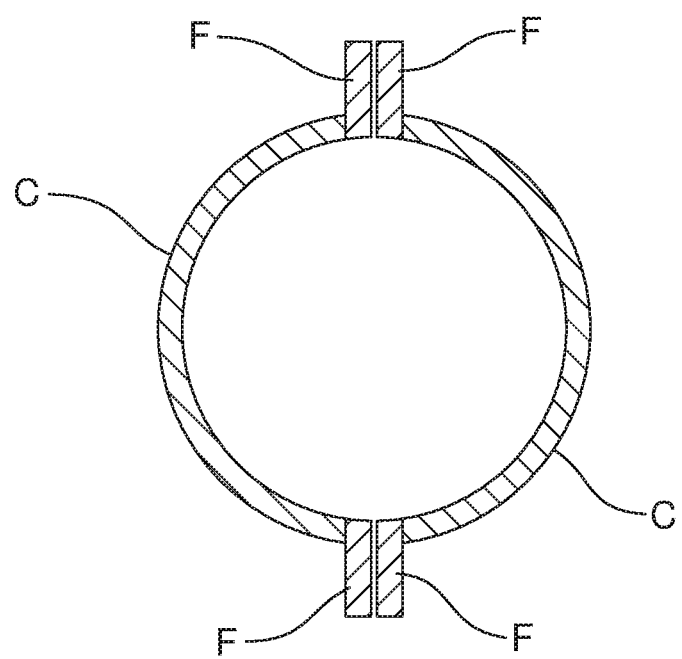
FIG. 1b is an end section of the prior art crush-can illustrated in FIG. 1a showing the crush-can being made from two halves that are connected together by cooperating flanges.

Reference will now be made in detail to the present preferred embodiments of the crush-can, examples of which are illustrated in the accompanying drawing figures.

DETAILED DESCRIPTION

Reference is now made to FIGS. 2-5, illustrating a first embodiment of the new and improved crush-can 10. As illustrated, the crush-can 10 includes a first or outer wall 12, a second or inner wall 14 within the first wall and a corrugated core 16 between the first wall and the second wall. In the illustrated embodiment, the first wall 12 and the second wall 14 are both frustoconical in shape. In one possible embodiment the first wall 12 and the second wall 14 taper at an angle of between 3 and 5 degrees.

In one possible embodiment, the first wall 12 has a thickness of between about 0.1 mm and about 0.3 mm. In another possible embodiment the first wall 12 has a thickness of between about 0.1 mm and about 0.2 mm.

Similarly, in one possible embodiment the second wall 14 has a thickness of between about 0.1 mm and about 0.3 mm. In another possible embodiment, the second wall 14 has a thickness of between about 0.1 mm and about 0.2 mm.

The corrugated core 16 is made from a material having a wall thickness of between about 0.1 mm and about 0.3 mm. In another possible embodiment, the corrugated core 16 is made from a material having a wall thickness of between about 0.1 mm and about 0.2 mm.

In one possible embodiment, the corrugated core 16 has an overall width between the first wall 12 and the second wall 14 of between about 2.0 mm and about 3.0 mm. As will be described in greater detail below, the first wall 12, the second wall 14 and the corrugated core 16 may be made by 3D printing with powdered steel, aluminum or any appropriate plastic or composite material as desired for any specific application. In any embodiment of the crush-can 10, the thicknesses of the materials used to construct the first wall 12, the second wall 14 and the corrugated core 16 may be optimized to maximize weight efficiency while meeting energy absorption targets. In general, the outermost and innermost material layers or walls 12, 14 contribute more towards the energy absorption during a crushing. As such, use of higher proportions of metals in these surface layers or walls 12, 14 will generally contribute to higher energy absorption and therefore higher specific energy absorption (SEA). Since the crush-can 10 may be made by 3D printing, the body 18 of the crush-can 10, including the first wall 12, the second wall 14 and the corrugated core 16 may be made flangeless if desired. Alternatively, a flange (not shown) may be intentionally provided if the flange is required for attaching an external part.

Figure 2:
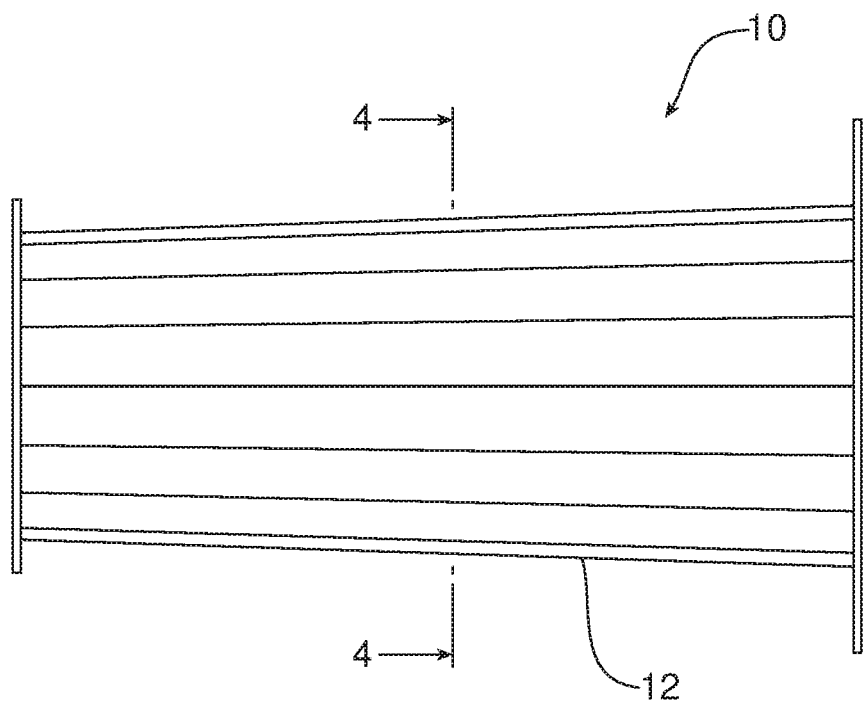
FIG. 2 is a side elevational view of the new and improved crush-can that is the subject matter of this document.
Figure 3:
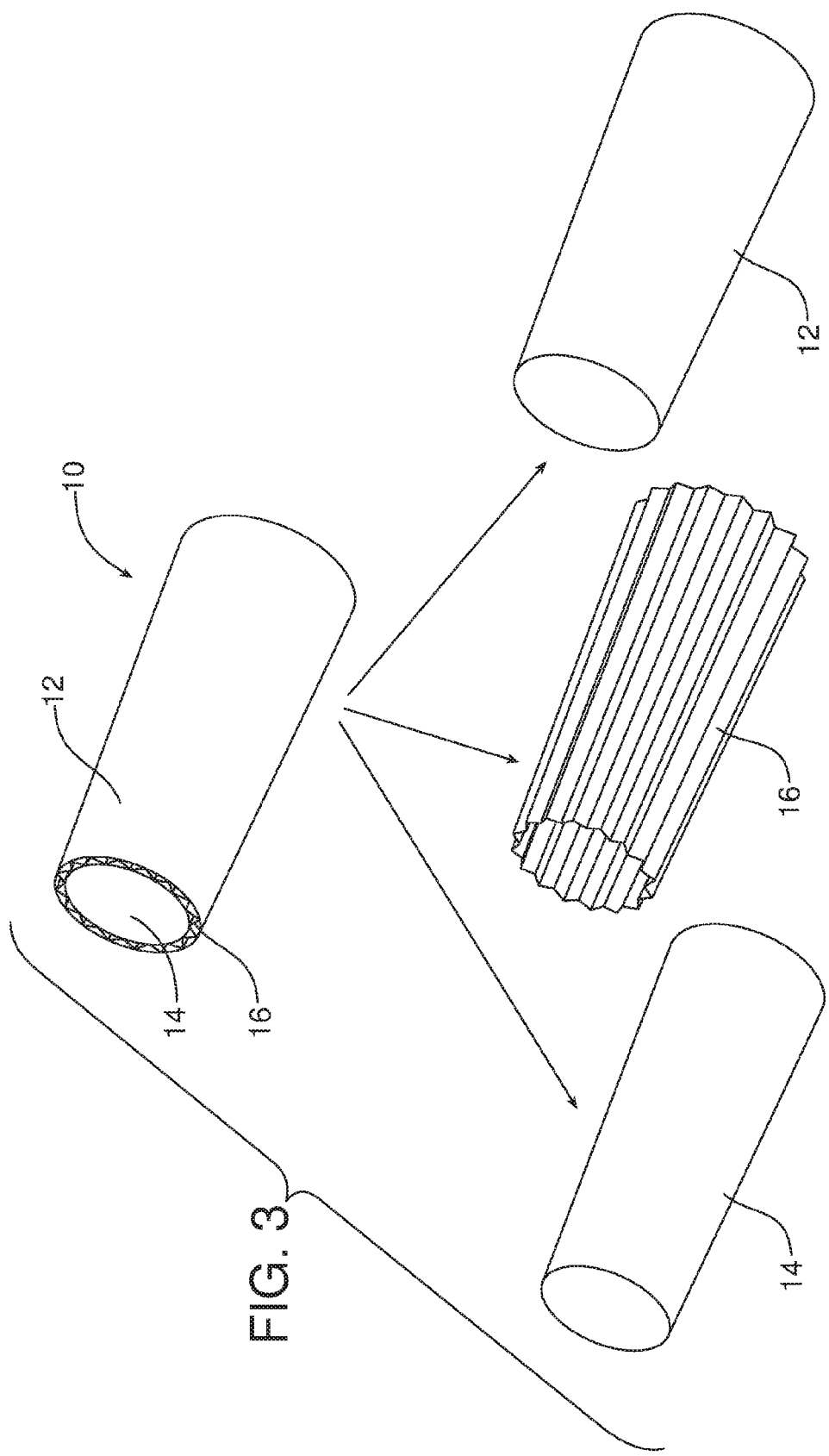
FIG. 3 is an exploded perspective view of the body of the new and improved crush can illustrating a first wall, a second wall and the corrugated core that is provided between the first and second walls.
Figure 4:
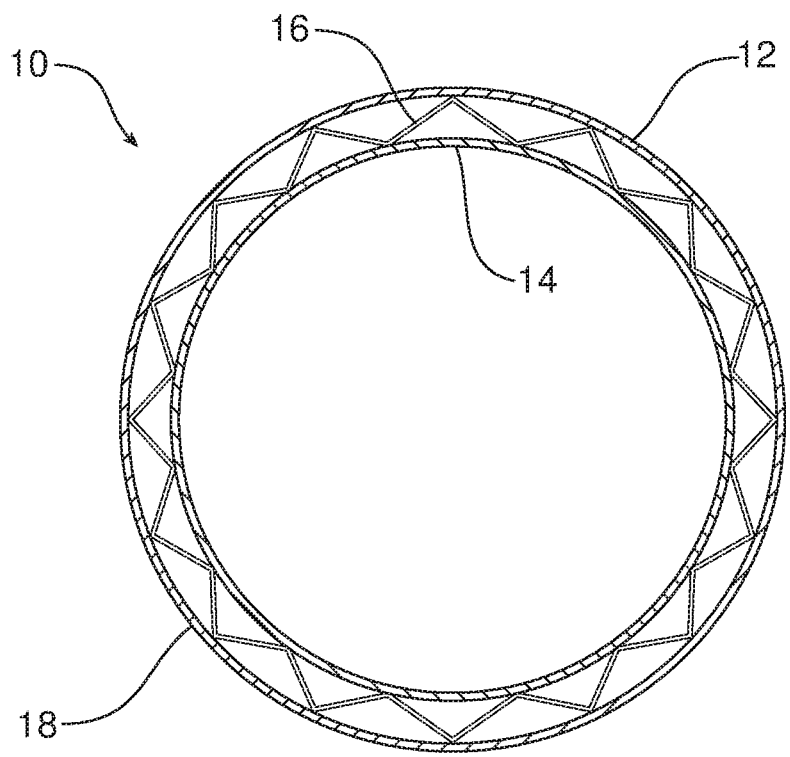
FIG. 4 is a cross-sectional view of the assembled crush-can illustrated in FIGS. 2 and 3.
Figure 5:
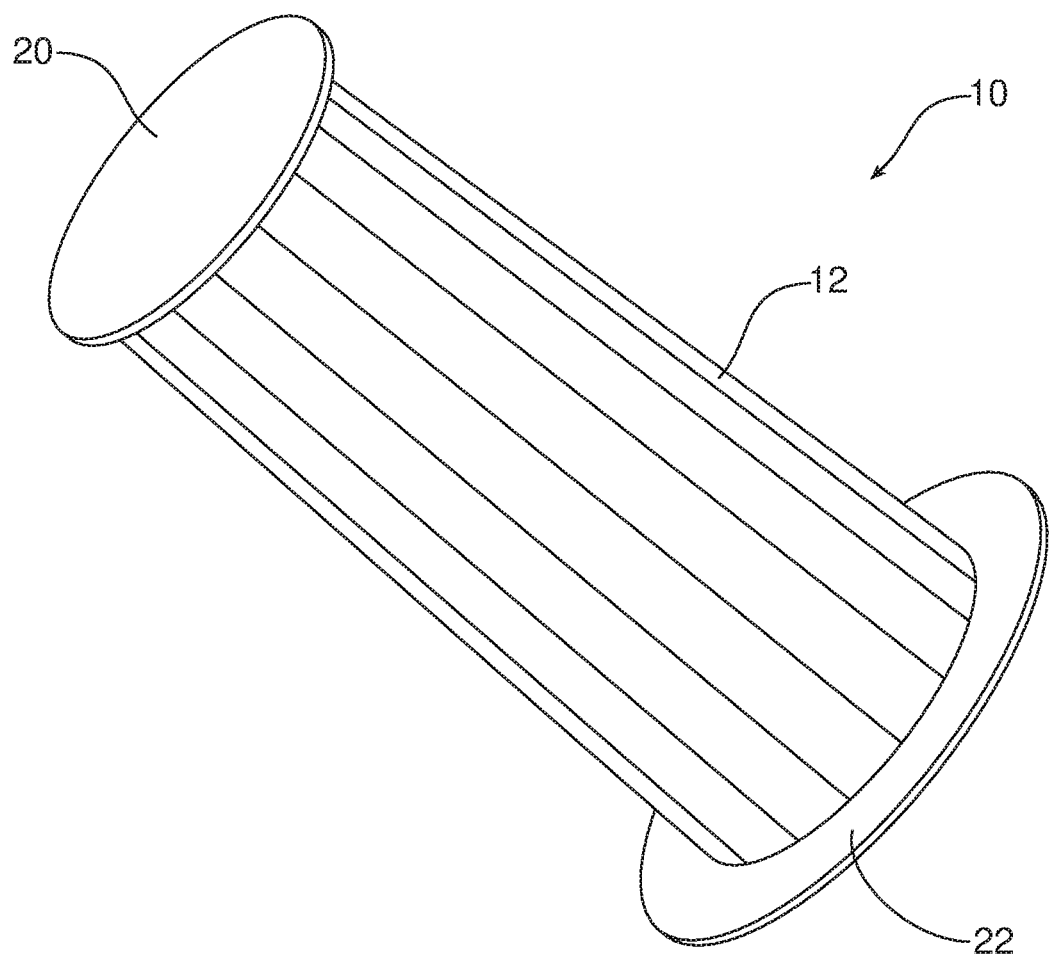
FIG. 5 is a perspective view of the new and improved crush-can illustrated in FIGS. 2-4 clearly showing the first and second end elements that close the two ends of the crush-can.

As further illustrated in FIGS. 2 and 5, the crush-can 10 may be closed at a first end by means of a first end element 20 and closed at a second end by means of a second end element 22. The end elements 20, 22 may be made from any appropriate material including, but not necessarily limited to powdered steel, aluminum and appropriate plastics or composite materials. The end element can have solid sections so that they can be secured properly with front bumper B and backup rail R. Typically, these end elements 20, 22 should have a length and width of between about 12.6 cm and about 17.6 cm and a thickness of between about 1.5 mm and about 2.5 mm. Advantageously, the first and second ends 20, 22 may allow for the mounting of the crush-can between a bumper B and a side rail R without the need for additional brackets thereby reducing production and assembly costs.

Figure 6:
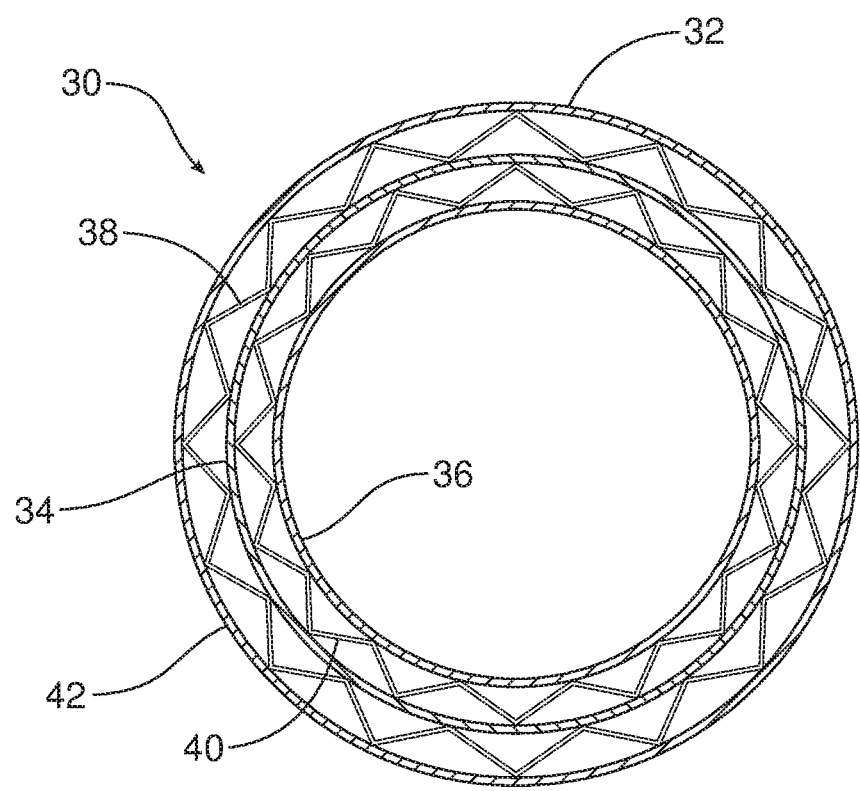
FIG. 6 is a cross-sectional view of an alternative embodiment of the new and improved crush-can including a corrugated core between the first wall and the second wall and a second corrugated core between the second wall and a third wall.

Reference is now made to FIG. 6 illustrating in cross-section an additional, alternative embodiment of a crush-can 30. The crush-can 30 includes a first wall 32, a second wall 34 within the first wall 32 and a third wall 36 within the second wall 34. A corrugated core 38 is provided between the first wall 32 and the second wall 34. A second corrugated core 40 is provided between the second wall 34 and the third wall 36.

The first, second and third walls 32, 34, 36 may all be constructed by means of 3D printing from powdered steel, aluminum, plastic, composite or other appropriate materials. Typically, the walls 32, 34, 36 have a thickness of between about 0.1 mm and about 0.3 mm or between about 0.1 mm and about 0.2 mm.

The corrugated core 38 and second corrugated core 40 may also be constructed by means of 3D printing from powdered steel, aluminum, plastic, composite or other appropriate material. The material from which the corrugated core 38 and the second corrugated core 40 are constructed typically has a thickness of between about 0.1 mm to about 0.3 mm or between about 0.1 mm to about 0.2 mm. Further, the corrugated core 30 may be constructed so as to have a width between the first wall 32 and the second wall 34 of between about 2.0 mm and about 3.0 mm. Similarly, the second corrugated core 40 may be constructed to have a width between the second wall 34 and the third wall 36 of between about 2.0 mm and about 3.0 mm. Further, as with the first embodiment, the frustoconical first, second and third walls 32, 34, 36 may all be tapered at an angle of between about 3 and about 5 degrees.

While not illustrated in FIG. 6, it should be appreciated that the body 42 of the crush-can 30 including the first wall 32, the second wall 34, the third wall 36, the corrugated core 38 and the second corrugated core 40 may be closed at each end by first and second end elements similar to the first and second end elements 20, 22 that close the body 18 of the first embodiment of the crush-can 10 illustrated in FIGS. 2-5.

Traditional manufacturing methods will be extremely challenging to assemble the three parts (12, 14 and 16) to produce the crush-can. In contrast, 3D printing technology allows one to directly print the assembled crush-can with outer/inner walls 12, 14 and the corrugated inner core 16. Thus, a method for producing a crush-can includes the step of 3D printing a unitary crush-can body including a first wall, a second wall within the first wall and a corrugated core between the first and second walls.

In addition, the method may include the step of closing a first end of the crush-can 10 with a first end element 20. Similarly, the method may be described as including the step of closing a second end of the crush can 10 with a second end element 22. In an alternative embodiment, the two end elements are 3D printed with the crush-can body and are a part of the unitary construction. Thus, it should be appreciated that the entire crush-can may be made simply by 3D printing and no other assembly steps.

In summary, a number of benefits are provided by the new and improved crush-can 10, 30 described in this document. As noted above, the completely assembled crush-can 10, 30 with all component parts can be easily manufactured as a single unitary part using 3D printing. The ends 20, 22 allow the crush-can 10 to be easily anchored to the bumper B and the side rail R without the need for extra brackets BR as required with the prior art crush-can design illustrated in FIGS. 1a and 1b.

As previously noted, since the crush-can 10 may be produced by means of 3D printing, no flanges are required. This provides additional weight efficiency. Further, it should be appreciated that 3D printing of the corrugated core 16 allows the internal ribs of that core to be varied in thickness along the length of the crush-can 10 for additional efficiency in energy absorption.

As evidenced by the alternative embodiment illustrated in FIG. 6, the crush-can 10 may include multiple corrugated core layers 38, 40. The crush-can 10 includes a single corrugated core 16 while the crush-can 30 includes the corrugated core 38 and a second corrugated core 40. Here it should be appreciated that a crush-can constructed in accordance with the teachings of this document may include additional walls and additional corrugated core layers as desired to meet the needs of any particular application.

As previously noted, it should also be appreciated that the thickness of the material forming the walls 12, 14, 32, 34, 36 and the corrugated cores 16, 38, 40 can be varied and optimized to maximize weight efficiency while meeting energy absorption targets. Further, while the two core layers 38, 40 of the embodiment illustrated in FIG. 6 have the same overall thickness and the same material wall thickness, it should be appreciated that both the overall core thickness and/or material wall thickness may be different for the two cores depending upon the design specifications of any particular application. Testing has demonstrated that weight efficiencies as high as 70% may be achieved and thereby yield high specific energy absorption (SEA).

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A crush-can, comprising:
   a first wall, wherein said first wall is frustoconical in shape;
   a second wall within said first wall; and
   a corrugated core between said first wall and said second wall.

2. The crush-can of claim 1, wherein said second wall is frustoconical in shape.

3. The crush-can of claim 1, further including a first end element closing a first end of said crush-can.

4. The crush-can of claim 3, further including a second end element closing a second end of said crush-can.

5. The crush-can of claim 4, wherein said corrugated core has a width between said first wall and said second wall of between about 2.0 mm and about 3.0 mm.

6. The crush-can of claim 5, wherein said first wall has a thickness of between about 0.1 mm and about 0.2 mm.

7. The crush-can of claim 6, wherein said second wall has a thickness of about 0.1 mm and about 0.2 mm.

8. The crush-can of claim 7, wherein said crush-can is flangeless.

9. The crush-can of claim 1, further including a third wall within said second wall and a second corrugated core between said second wall and said third wall.

10. The crush-can of claim 9, wherein said third wall is frustoconical in shape.

11. The crush-can of claim 10, further including a first end element closing a first end of said crush-can.

12. The crush-can of claim 11, further including a second end element closing a second end of said crush-can.

13. The crush-can of claim 12, wherein said corrugated core has a width between said first wall and said second wall of between about 2.0 mm and about 3.0 mm.

14. The crush-can of claim 13, wherein said second corrugated core has a width between said second wall and said third wall of between about 2.0 mm and about 3.0 mm.

15. A method of producing a crush-can, comprising:
   3D printing a unitary crush-can body including a first wall having a frustoconical shape, a second wall within said first wall and a corrugated core between said first wall and said second wall.

16. The method of claim 15, including closing a first end of said crush-can body with a first end element.

17. The method of claim 16 including closing a second end of said crush-can body with a second end element.

18. The method of claim 15 including 3D printing first and second end elements with said crush-can body as a part of a unitary construction.

19. A crush-can, comprising:
   a first wall;
   a second wall within said first wall, wherein said second wall is frustoconical in shape; and
   a corrugated core between said first wall and said second wall.

* * * * *